Figure 1:
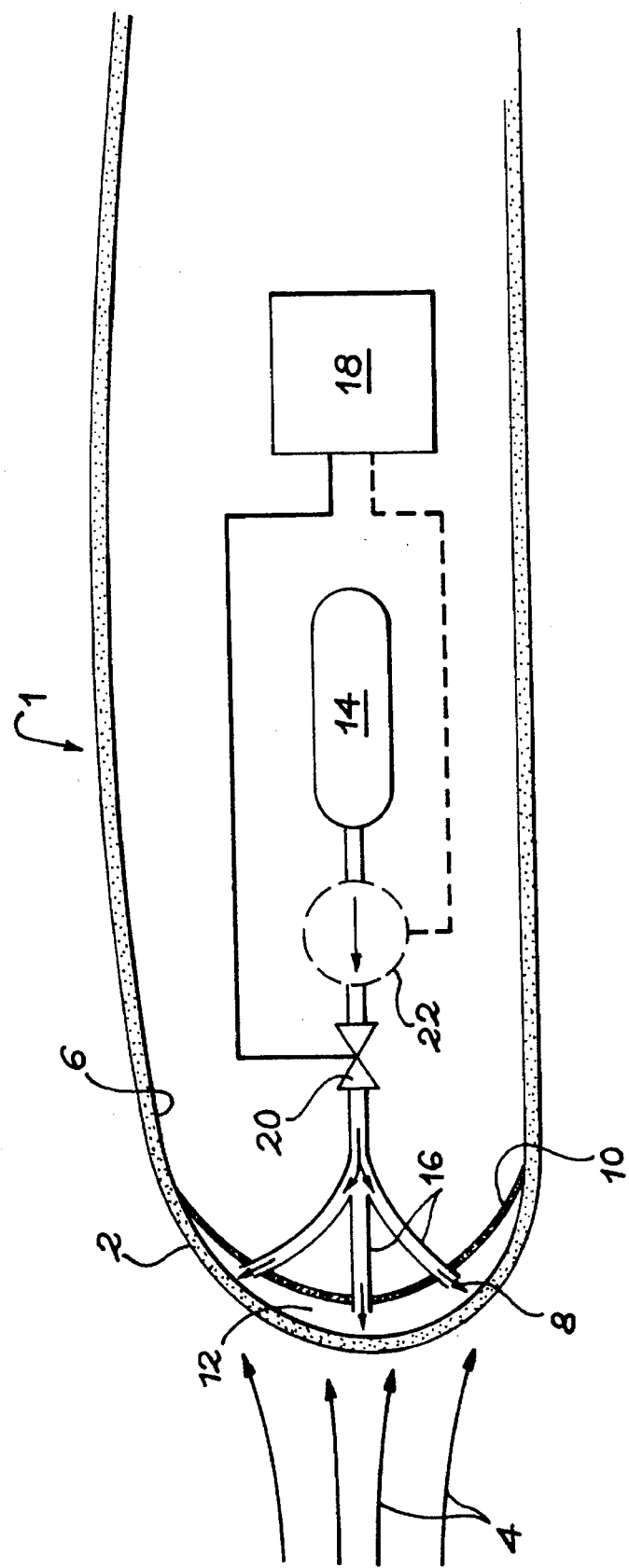

United States Patent [19]
Piketty-Leydier et al.

[11] Patent Number: 5,498,760
[45] Date of Patent: Mar. 12, 1996

[54] PROCESS AND SYSTEM FOR PROTECTING AN OXIDIZABLE MATERIAL AGAINST OXIDATION

[75] Inventors: Laurence Piketty-Leydier, Croissy/Seine; Jean-Marc Dorvaux, Rueil; Gérard Rousseau, St. Aubin de Medoc, all of France

[73] Assignee: Aerospatiale Societe Nationale Industrielle, France

[21] Appl. No.: 146,988

[22] Filed: Nov. 2, 1993

[30] Foreign Application Priority Data

Nov. 2, 1992 [FR] France ................... 92 13094

[51] Int. Cl.⁶ ................ C23C 4/04; B05D 3/02
[52] U.S. Cl. ............. 427/452; 427/229; 427/243; 427/255; 427/255.2; 427/255.4; 427/255.7; 427/377; 427/349; 427/453; 427/454; 427/245
[58] Field of Search ................. 427/228, 399, 427/255.4, 255.2, 452–454, 377, 243, 244, 255.7, 255; 118/715

[56] References Cited

U.S. PATENT DOCUMENTS

| | | | |
|---|---|---|---|
| 3,026,806 | 3/1962 | Runton et al. | 102/92.5 |
| 3,682,100 | 8/1972 | Lindberg | 102/105 |
| 4,268,538 | 5/1981 | Toole et al. | 427/255.4 |
| 4,402,992 | 9/1983 | Liebert | 427/243 |
| 5,009,961 | 4/1991 | Niebylski | 428/446 |

FOREIGN PATENT DOCUMENTS

| | | |
|---|---|---|
| 0359614 | 2/1989 | European Pat. Off. . |
| 0428083 | 11/1990 | European Pat. Off. . |

OTHER PUBLICATIONS

H. Sakoshiri, "Surface Roughening of Ceramics for Metal Coating", p. 357, Chemical Abstracts, vol. 115, Nov. 1991.

*Primary Examiner*—Janyce Bell
*Attorney, Agent, or Firm*—Hayes, Soloway, Hennessey, Grossman & Hage

[57] ABSTRACT

Process and system for protecting an oxidizable material against oxidation.

The process according to the invention consists of forming a gas-permeable body (1) having open pores (28), a first surface (2) intended to come into contact with an oxidizing gaseous flow (4) liable to oxidize the body and a second surface (6) opposite to the first surface and injecting an oxygen-free protective gas (8) through the second surface (6) leading to disturbances in the material giving it a protection against oxidation.

20 Claims, 2 Drawing Sheets

PROCESS AND SYSTEM FOR PROTECTING AN OXIDIZABLE MATERIAL AGAINST OXIDATION

DESCRIPTION

The present invention relates to a process and a system for protecting an oxidizable material, such as a carbon compound, against oxidation, so as to render said material non-oxidizable at high temperatures of approximately 1900° C. and at low pressures, for long periods.

This material is more particularly intended for use as a high performance heat protection in the production of spacecraft (shuttles, aircraft, spaceplanes) having to withstand high heating effects caused by air friction during their high speed reentry into the atmosphere.

More particularly, the invention is directed at the production of parts such as noses, ailerons or leading edges of such spacecraft and which are subject to variable temperatures ranging from 1000° to 1600° C. and pressures between $5.10^2$ Pa and $10^4$ Pa. However, the invention also applies to other industrial sectors requiring the use of lightweight structures able to withstand high mechanical stresses under temperatures exceeding 1100° C.

The oxidizable materials to which the present invention applies are either solid substrates, or composite materials constituted by reinforcing fibres embedded in an oxidizable matrix such as a carbon-containing matrix (carbon or doped carbon) or a ceramic matrix such as of silicon carbide, boron nitride, silicon nitride and boron carbonitride. The fibres can be short or long, woven or coiled, braided or plaited.

They can be arranged in one, two, three, four or more directions. They are also made from a refractory material such as graphite, carbon, alumina, boron nitride and silicon carbide.

In more general terms the invention applies to any oxidizable material having to withstand high temperatures for long periods.

The advantage of carbon-containing composite materials is that they retain their mechanical integrity under high temperatures. Unfortunately, these materials suffer from the disadvantage of significantly oxidizing as from 450° C. in the presence of air, so that CO and $CO_2$ form leading to their destruction. It is therefore vital to develop a reliable oxidation protection for these materials.

Different methods have already been envisaged for protecting carbon-containing materials against oxidation.

The presently most widely used anti-oxidation protection method is based on the use of an external coating, generally based on silicon carbide associated with a silica or borosilicate glass which seals the cracks of the outer coating, said cracks being due to heat expansion coefficient differences between said coating and the carbon-containing materials, cf. FR-A-2 611 198.

This solution is intrinsically limited to a restricted range of pressures ($10^2$ to $10^5$ Pa) and temperatures (1000° to 1550° C.). Thus, at low temperature, the viscosity of the glass is too high in order to effectively seal the cracks, whereas at high temperatures the viscosity may become too low and the glass may no longer adhere to the coating. Moreover, the coating and glass can react with one another in order to bring about a deterioration of the protection.

An improved solution described in FR-A-2 635 773 or FR-A-2 671 798 consists of using an aluminium nitride-alumina bilayer on the outer silicon carbide coating. However, said coating has under certain conditions of use (long mission of e.g. a spaceplane) a possibly inadequate efficiency against oxidation. Thus, under certain conditions, the multilayer coating may allow oxygen in the air to diffuse up to the carbon material and thereby bring about its oxidation. Therefore there is a time limitation to its use.

These multilayer coatings are produced in several stages. Thus, the outer coating is formed by siliciding the carbon substrate, followed by chemical vapour deposition of silicon carbide, which ensures that the sealing of the cracks within the coating is initiated. This is followed by the deposition of the glass or the $AlN/Al_2O_3$ bilayer on the silicon carbide.

Furthermore, in certain cases, the use of a multilayer coating may be too sophisticated. Thus, it would be of interest to have in certain cases a carbon-containing and in general oxidizable material which is protected against oxidation in an easier way and not suffering from the disadvantages referred to hereinbefore.

Therefore the invention relates to a process for protecting against oxidation an oxidizable material having open pores making it permeable to gases and having a first surface intended to come into contact with an oxidizing gaseous flow liable to oxidize it and a second surface opposite to the first. According to the characteristics of the invention, using an injection system the process consists of injecting an oxygen-free protective gas through said second surface, said protective gas being liable to limit the access of oxygen to the interior of the pores of the material and block the active sites of said material.

In particular, said material can be used in a wider temperature and pressure range than sealing glass structures and for two to three times longer periods than in the case of the presently known, most sophisticated multilayer structures.

The injection of the protective gas aims at limiting the access kinetics of oxygen into the pores of the material by dilution and entrainment of the oxygen, so as to limit the oxygen content of the gas layer in contact with the outer surface of the material. The injection of gas also makes it possible to block the active sites of the material, i.e. those sites which are attacked in preferred manner by the oxygen (sites said to be active up to 900° C.). Therefore the invention leads to a lightweight material, which can easily be produced.

The speed of the injected gas will depend both on the conditions of use of the material such as the concentration and flows of gaseous species present, which are essentially environmental oxygen and the protective gas, as well as the morphological characteristics of the material, such as its permeability to the gases and its constitution.

In particular, in order to provide an effective protection, both on the surface and in the pores of the material, the flow rate of the gas to be injected can exceed that of the oxidizing gas in order to oppose the latter. During reentry into the atmosphere, the speed of a space vehicle and therefore the oxidizing flow varies between Mach 25 and 0.4.

The invention preferably applies to a composite material having reinforcing fibres embedded in a matrix. This matrix is made from one of the materials referred to hereinbefore and is preferably essentially based on carbon and is optionally doped by silicon carbide with a concentration of 0 to 20 volume %. The matrix can be formed by gaseous or liquid impregnation of a fibrous preform.

The reinforcing fibres can be produced from one of the aforementioned materials. Preferably, the fibres are woven and made from carbon or graphite, as a result of the high thermal and mechanical strength characteristics.

The term "carbon" also covers graphite within the remainder of the present text.

The protective gas usable in the invention must be free from oxygen and can be neutral, or even reducing. In addition, it is possible to use nitrogen, rare gases ( neck, argon ), chlorine, ammonia, etc. Preferably, use is made of an inert gas such as nitrogen.

In order to improve the oxidation protection of the material, a gas-permeable outer coating formed from a ceramic different from a glass can be provided on the outer surface of the material in contact with the oxidizing gas. This coating is typically a nitride, carbide, silicide or oxide.

Preferably, the outer coating is of silicon nitride or alpha-alumina.

The use of an outer coating makes it possible to reduce the speed and therefore the flow rate of the injected protective gas. Like the oxidizable material, said outer coating must be permeable to the injected gas, so that the latter opposes the oxidizing flow.

Silicon nitride and alumina have the advantage of having high thermal and mechanical properties combined with a good resistance to oxidation and substantially identical to those of the silicon carbide generally used as the outer coating. In particular, these materials remain intact up to 1900° C. for $Si_3N_4$, where it starts to decompose, and 2050° C. for $Al_2O_3$, where it starts to melt.

In addition, the heat expansion coefficient of silicon nitride is compatible with that of carbon.

Unlike the outer coatings used at present for providing protection against oxidation, the coating according to the invention is intended for use without a sealing gas.

The different manufacturing methods for silicon nitride lead to materials having widely differing properties.

Under severe atmosphere reentry conditions, silicon nitride will tend to oxidize and can lead to the formation of cracks and/or to the thinning of said coating. In addition, damage to the outer coating can be caused by an impact with a micrometeorite or with space debris.

Therefore the inventors have envisaged the production of this coating in accordance with a procedure ensuring the repair of the damaged layer and consequently the reuse of the spaceplane for another mission. In addition, the method chosen for the production of the silicon nitride or the alumina must ensure a good attachment of the outer coating to the oxidizable and more specifically carbon-containing materials. The outer $Si_3N_4$ coating is advantageously obtained by nitriding a silicon foam deposited on the permeable body or by the pyrolysis of a nitrogen and silicon-containing polymer, which is the silicon nitride precursor. This pyrolysis is advantageously carried out in the presence of a silicon nitride powder.

The outer Al O coating can also advantageously be obtained either by the liquid route using an alumina sol deposited on the permeable body and heat treated (sol-gel method), or by plasma spraying.

In addition, all these methods are compatible with the covering of large, complex parts. They also give the coating a controllable porosity and permeability adequate for permitting the passage of the injected gas, so that it can oppose the oxidizing flow.

In order to improve the attachment of the alpha-alumina or silicon nitride coating on the oxidizable and e.g. carbon-containing body, it is possible to place between the permeable (porous) outer coating and the body, an attachment layer which is chemically inert with respect to the body and the outer coating. This layer is more particularly formed by silicon carbide alone or a SiC/AlN bilayer. The SiC is more particularly formed by the siliciding of the carbon material using known procedures. This method retains and increases the gas permeability of the material.

The invention also relates to a system for protecting against oxidation a gas-permeable, oxidizable material, having a first surface to come into contact with an oxidizing gaseous flow liable to oxidize the body and a second surface opposite to the first, characterized in that it comprises means for injecting an oxygen-free protective gas through the second surface, said protective gas being able to limit the access of oxygen to the interior of the pores of the material and block the active sites of said material.

The invention is described in greater detail hereinafter relative to the attached drawings, wherein show:

FIG. 1 Diagramatically and in section a composite material part protected in accordance with the invention.

Figure 2:
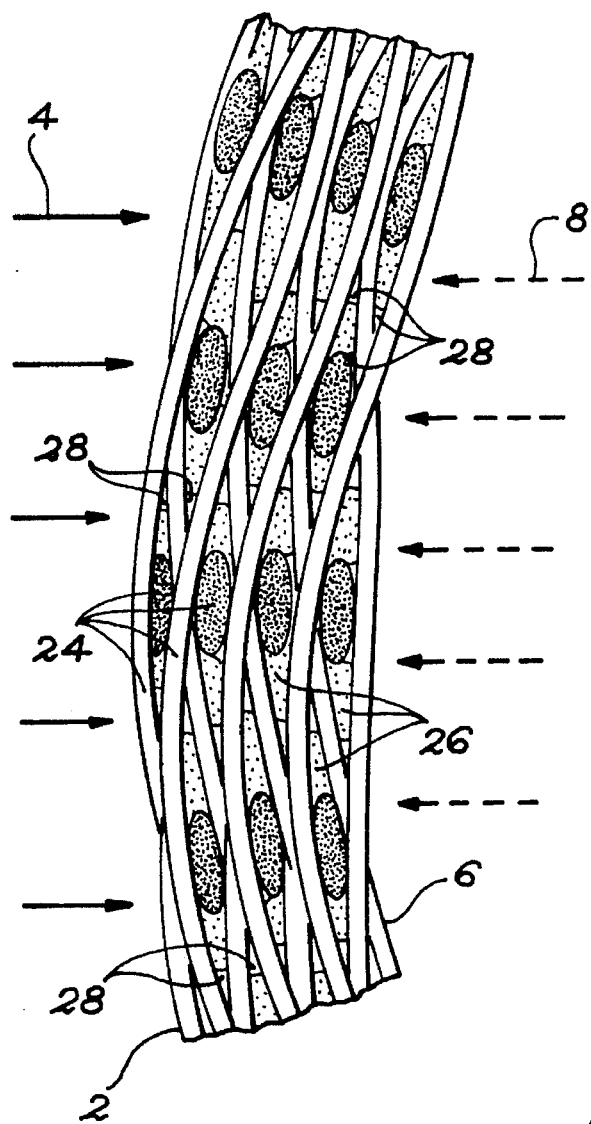

FIG. 2 In greater detail the composite structure of the carbon-containing material of FIG. 1.

Figure 3:
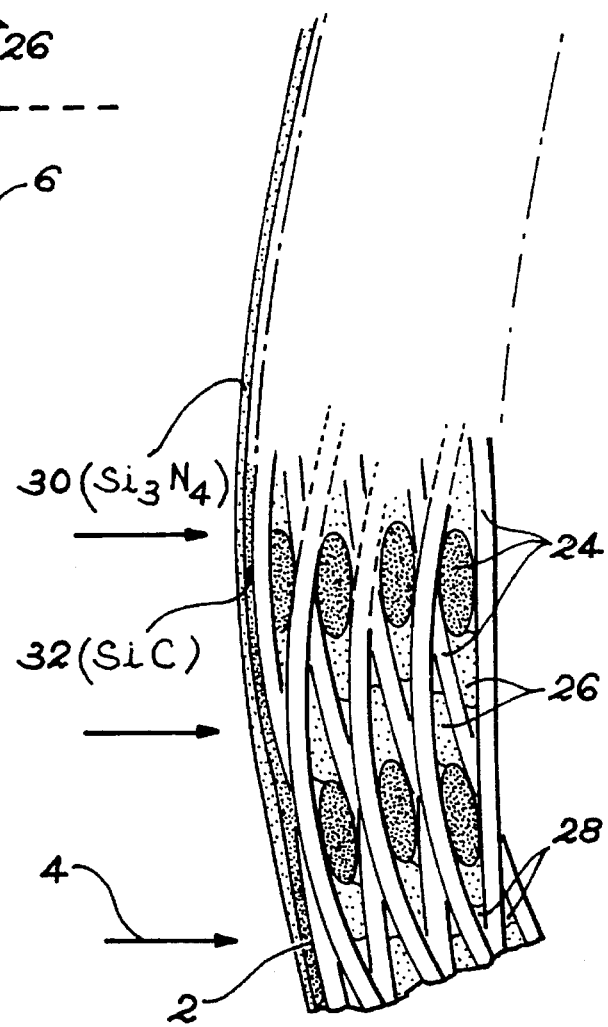

FIG. 3 A variant of the invention using a gas-permeable, ceramic outer coating.

The oxidation protection process and system according to the invention more particularly applies to a carbon/carbon-type composite material. The following description will apply to such a material.

Moreover, no matter what the production procedure of this material, the latter must be sufficiently permeable to gas (porous) for the performance of the invention.

The carbon/carbon material to which the invention applies is more particularly intended for the production of the nose, leading edges and ailerons of a spaceplane. FIG. 1 diagrammatically shows in section a spaceplane wing. Reference numeral 1 indicates in general terms the permeable, composite material part to which the invention applies.

With reference to FIGS. 1 and 2, said material has an outer surface 2 to come into contact with an oxidizing air flow 4 and an inner surface 6, opposite to the outer surface 2 and permeable to the gas.

In order to ensure its protection against oxidation by the oxidizing flow 4, an inert, protective gas 8, which is free from oxygen, such as nitrogen is injected through the inner surface 6 of the composite material. The gas 8 is injected at a speed higher than that of the flow 4 and consequently is able to oppose the said flow and therefore effectively protect the material.

To prevent the diffusion of said protective gas 8 into any composite material part 1, in this case the wing, a tight wall 10 can be provided to the rear of the surface 6, the wall 10 and the surface 6 thus defining an injection chamber 12.

The system permitting gas injection has a compressed gas tank 14, which has to be linked with the injection chamber 12 via ducts 16. The injection of the protective gas 8 is only ensured when the outer surface 2 is exposed to the oxidizing flow 4, e.g. during the spaceplane's reentry into the atmosphere.

In this case, the injection of gas is controlled by one of the microprocessors 8 on board the spaceplane. This microprocessor 18 controls the opening and closing of an electrovalve 20 located at the outlet of the tank 14 and mounted on the ducts 16.

In order to aid gas ejection, a gas circulating pump 22 can optionally be placed between the electrovalve 20 and the tank 14, its operation also being controlled by the microprocessor 18.

As shown in greater detail in FIG. 2, the composite material according to the invention is constituted by graphite or carbon fibres 24 woven in accordance with the known procedure with respect to composite materials, e.g. 2D, 2.5D, 3D. These fibres are in fact strands constituted by several hundred carbon fibrils and form/rig the fibrous frame of the composite material.

These fibres are embedded in a carbon matrix 26 more particularly resulting from the pyrolysis of a carbon-precursor polymerized resin, such as phenol formaldehyde or furan resins or the pyrolysis of a pitch or asphalt.

In FIG. 2, reference 28 indicates the pores of the composite material 1. These pores are located more particularly between the woven fibre strands.

In order to improve the protection against oxidation of the carbon-containing material, in the manner shown in FIG. 3, the outer surface 2 is advantageously covered with an alpha-alumina or silica nitride, gas-permeable (porous) outer coating 30 having a thickness between 10 and 1000 μm.

In order to improve its attachment to the carbon material 1, a silicon carbide attachment layer 32 can be placed between the coating 30 and the surface 2 of the material 1. The thickness of the layer 32 ranges between 10 and 1000 μm.

According to the invention, the coating 30 and layer 32 cover the entire composite material outer surface 2 intended to come into contact with the oxidizing flow 4. The use of the coating 30 makes it possible to limit the flow rate of the injected protective gas and therefore the gas quantity carried on board.

In order to repair the coating 30 in the case of cracking or deterioration, it is produced either by nitriding silicon deposited on the outer surface of the material, or by the pyrolysis of a $Si_3N_4$ precursor silicon and nitrogen-containing polymer, such as a polyalkyl silazane, preferably in the presence of silicon nitride powder (in which the alkyl radical can have 1 to 10 carbon atoms), or by the heat treatment of a boehmite gel (hydrated, gamma-alumina), or by $Al_2O_3$ plasma spraying.

1). The nitriding method. According to the invention, a slop is formed by ultrasonic dispersing of silicon powder in water. In order to time-stabilize the suspension, this requires the use of a physical repulsion means between the grains. This repulsion can be electrostatic or steric. In particular, it is possible to use an electrostatic repulsion by controlling the pH of the solution. The best dispersion state is obtained for a basic pH between 10 and 12. Steric repulsion is obtained by acting on the powder concentration.

For a 5 μm grain size STA silicon powder from Poudmet (France), a sedimentation study for a pH of 10 to 12 and several concentrations made it possible to define an optimum Si powder concentration of 350 g/l for a pH of 11.7.

In order to improve the diction of the powder, a dispersing agent such as ammonium polyacrylate can be used. A good dispersion can be obtained with Darvan C at a concentration representing 0.4 to 0.8% of the powder mass.

Under these conditions, a silicon foam is obtained which is very homogeneously deposited, like a paint, on the outer surface 2 of the material. After drying in air, the silicon is nitrided and this consists of exposing the foam for several hours (4 to 5) to temperatures close to the melting point of the silicon (1420° C.) in the presence of nitrogen.

This gives a silicon nitride layer with a good attachment to carbon. Analysis by X-ray diffraction indicates that this silicon nitride is crystallized in form $x\text{-}Si_3N_4$.

The thickness of the deposit varies between 760 and 1000 μm and its texture is extremely porous. The open pores measured by water porosity is 30%.

2). Pyrolysis of a liquid precursor. The liquid precursor used is in particular a monomethyl silazane polymer of formula $(-Si(CH_3)H-NH-)_n$ with n ranging between 33 and 170 and being typically 85, which corresponds to a molar mass of 2000 to 10000 g.

Pyrolysis of the polymer makes it possible to break the Si—H, Si—CH$_3$ and N—H bonds, so as to only leave the Si—N bonds. Thus, the polysilazane is decomposed to $Si_3N_4$.

In order to obtain a more homogeneous coating and a better volume yield, $Si_3N_4$ powder is added to the monomethyl silazane in approximate proportions of 20/80 to 80/20 and typically 50/50.

In order to improve powder dispersion, a deflocculant (approximately 1%) such as KD1 hythermer produced by ICI (USA) is added to the polysilazane in trichloroethane. The mixture obtained is then spread in the form of a fine layer paint into the outer surface 2 of the composite material. The coating is then polymerized and pyrolyzed under nitrogen.

Polymerization is obtained by slowly heating for 1 to 3 hours the said material up to a temperature of 350° C., which is maintained for several hours (typically 5 hours).

Pyrolysis is obtained by then heating the material to 600° C. and maintaining said temperature for a few hours (1 to 2 hours).

After again dropping the material to ambient temperature, a 20 to 50 μm thick $Si_3N_4$ coating is obtained and its attachment to the material 1 causes no problems.

On the basis of X-ray diffraction analysis, the silicon nitride is still crystallized in x form, its porosity being 10 to 30%. The surface of the deposit is homogeneous and only slightly cracked.

The great ease of producing the silicon nitride coating and its good attachment to carbon-containing materials make it an excellent candidate for the protection of composite carbon/carbon materials. In addition, it meets the repairability criterion required in the case of parts intended for spaceplanes.

Although silicon nitride oxidizes actively at about 1600° C., it constitutes an effective barrier against oxidation, because it oxidizes much less rapidly than the composite carbon/carbon material.

3). Heat treatment of a boehmite gel. A boehmite sol $(Al_2O_3,nH_2O)$ is peptized in an aqueous medium (8 to 16% by weight $Al_2^-$) by nitric acid. A few percent of organic binder of type PVA (polyvinyl alcohol) and 1% of dispersant of the fluorocarbon polymer type (Fluoade$^{(R)}$-FC430) are added to the sol.

The boehmite is deposited on the carbon-containing body to be coated by dip coating or spraying. This is followed by drying and baking at about 500° C.

Several $Al_2O_3$ layers obtained in this way can be stacked until the sought thickness is obtained. The coating then undergoes a final heat treatment at 1500° C., which transforms the $Al_2O_3^-$ into porous alpha $Al_2O_3$.

Tests were performed on different samples.

The gas-permeable material was 7 mm thick, 2D woven C/C, obtained by the impregnation of fibres with a phenol formaldehyde resin, pyrolyzed at 1100° C. and then heat treated at 2000° C. The porosity of the C/C material was 30% by volume.

The $Si_3N_4$ coating was obtained from the pyrolysis of polymethyl silazane and $Si_3N_4$ powder, as described hereinbefore.

These tests are given in the following table (Δm/m) % representing the average weight loss of the material. On the basis of this table, it can be seen that a C/C composite material protected by $Si_3N_4$ deposited by the liquid route and subject to nitrogen gas injection with a pressure difference of $10^4$ Pa, has a total oxidation rate well below that obtained with a material protected without gas injection.

It can also be seen that an unprotected material exposed to a nitrogen injection with a pressure difference of $10^4$ Pa has an oxidation speed lower than that of the same material without gas injection.

Thus, it has been possible to demonstrate the real influence of the protection by gaseous injection on the reduction of the oxidation speed both of the composite material and the outer coating.

For weight reduction reasons, particularly in the case of a spacecraft, it is preferable to associate the $Si_3N_4$ or alumina layer with the injection of the gas.

The above description has obviously only been given in an illustrative manner. In particular, it is possible to carry out modifications with respect to the production procedure for the composite material, as well as the system of injecting the protective gas.

TABLE

|  | Protection | Pressure surface 2 | Pressure surface 6 | Flow rate (g/s · m³) | (Δm/m) % in 20 min |
|---|---|---|---|---|---|
| Case A: |  |  |  |  |  |
| C/C not coated with $Si_3N_4$ | Without injection | $5 \times 10^3$ Pa |  |  | 15.6 |
| Case B: |  |  |  |  |  |
| C/C not coated with $Si_3N_4$ | with $N_2$ injection | $5 \times 10^3$ Pa | $25 \times 10^3$ Pa | 28 | 2.3 |
| Case C: |  |  |  |  |  |
| C/C coated with $Si_3N_4$ | without injection | $5 \times 10^3$ Pa |  |  | 8.1 |
| Case D: |  |  |  |  |  |
| C/C coated with $Si_3N_4$ | with $N_2$ injection | $5 \times 10^3$ Pa | $25 \times 10^3$ Pa | 7 | 4.2 |

We claim:

1. Process for the protection against oxidation of an oxidizable material having open pores making it permeable to gases and having a first surface intended to come into contact with an oxidizing gaseous flow able to oxidize it and a second surface opposite to the first, characterized in that it consists of injecting by means of an injection system an oxygen-free protective gas through said second surface, said protective gas being able to limit the access of the oxygen to the interior of the pores of the material and block the active sites of said material.

2. Process according to claim 1, characterized in that the protective gas is injected at a speed enabling it to oppose the oxidizing gaseous flow.

3. Process according to claim 1 characterized in that the protective gas is chosen from among nitrogen, rare gases and chlorine.

4. Process according to claim 1, characterized in that the gas-permeable material is essentially made from carbon or carbon doped with silicon carbide.

5. Process according to claim 1, characterized in that the gas-permeable material comprises a fibrous reinforcement embedded in a matrix which essentially made from carbon or carbon doped with silicon carbide.

6. Process according to claim 5, characterized in that the reinforcement is made from carbon.

7. Process according to claim 1, characterized in that on the first surface is formed a gas-permeable outer coating made from a ceramic material differing from a glass and which also contributes to the oxygen protection of the material.

8. Process according to claim 7, characterized in that the outer coating is obtained by plasma spraying $Al_2O_3$.

9. Process according to claim 7, characterized in that the outer coating is of silicon nitride or alpha alumina.

10. Process according to claim 9, characterized in that the outer coating is obtained by nitriding a silicon foam deposited on the permeable body.

11. Process according to claim 10, characterized in that nitriding is carried out under nitrogen.

12. Process according to claim 10, characterized In that the silicon foam is formed by ultrasonic dispersing of silicon powder in an aqueous solution and by maintaining the pH of the aqueous solution between 10 and 12, said foam then being deposited on the permeable body and nitrated to form the outer coating (30).

13. Process according to claim 12, characterized in that the aqueous solution contains a dispersing agent.

14. Process according to claim 9, characterized in that the outer coating is obtained by the pyrolysis of a nitrogen and silicon-containing polymer deposited on the permeable body.

15. Process according to claim 14, characterized in that pyrolysis is performed in the presence of silicon nitride powder.

16. Process according to claim 14 characterized in that the nitrogen and silicon-containing polymer is a polymethyl silazane.

17. Process according to claim 9, characterized in that the outer coating is obtained by depositing an alumina sol on the permeable body and then heat treating said alumina sol.

18. Process according to claim 17, characterized in that the alumina sol is a boehmite sol.

19. Process according to claim 7, characterized in that between the outer coating and the gas-permeable material is placed an gas permeable attachment layer to improve the fixation of the outer coating on the oxidizable body said attachment layer being chemically inert with respect to said body and said outer coating.

20. Process according to claim 18, characterized in that the attachment layer is of gas-permeable silicon carbide.

* * * * *

UNITED STATES PATENT AND TRADEMARK OFFICE
CERTIFICATE OF CORRECTION

PATENT NO. : 5,498,760
DATED : March 12, 1996
INVENTOR(S) : PIKETTY-LEYDIER ET AL It is certified that error appears in the above-indentified patent and that said Letters Patent is hereby corrected as shown below:

Claim 5, Col. 7, line 62, after "which" insert --matrix is--.

Signed and Sealed this

Second Day of July, 1996

Attest:

BRUCE LEHMAN

Attesting Officer

Commissioner of Patents and Trademarks